Jan. 2, 1940.  C. G. FLYGARE  2,185,546

INDEXING ATTACHMENT FOR GRINDING MACHINES

Filed Nov. 2, 1938   2 Sheets-Sheet 1

Inventor
CARL G. FLYGARE

By George Crompty Jr.
Attorney

Jan. 2, 1940.　　　　　C. G. FLYGARE　　　　　2,185,546
INDEXING ATTACHMENT FOR GRINDING MACHINES
Filed Nov. 2, 1938　　　2 Sheets-Sheet 2

Inventor
CARL G. FLYGARE
By George Comptreys
Attorney

Patented Jan. 2, 1940

2,185,546

UNITED STATES PATENT OFFICE 2,185,546

INDEXING ATTACHMENT FOR GRINDING MACHINES

Carl G. Flygare, Worcester, Mass., assignor to Norton Company, Worcester, Mass., a corporation of Massachusetts Application November 2, 1938, Serial No. 238,430

2 Claims. (Cl. 51—165)

The invention relates to indexing attachments especially for grinding machines.

One object of the invention is to provide an attachment for a grinding machine permitting the wheel to be moved rapidly into position for grinding several shoulders on a shaft. Another object of the invention is to provide an indexing attachment in connection with a dial gauge accurately to locate a grinding wheel to grind a number of shoulders. Another object of the invention is to provide a device for predetermining with exactitude various positions of a grinding wheel with respect to a work holder or holders. Another object of the invention is to provide a simple device for accurately locating the work carriage or table of a grinding machine. Other objects will be in part obvious or in part pointed out hereinafter.

The invention accordingly consists in the features of construction, combinations of elements, arrangements of parts, and in the several steps and relation or order of each of said steps to one or more of the others thereof, all as will be illustratively described herein, and the scope of the application of which will be indicated in the following claims.

In the accompanying drawings illustrating one of many possible embodiments of the mechanical features of this invention;

Figure 1:
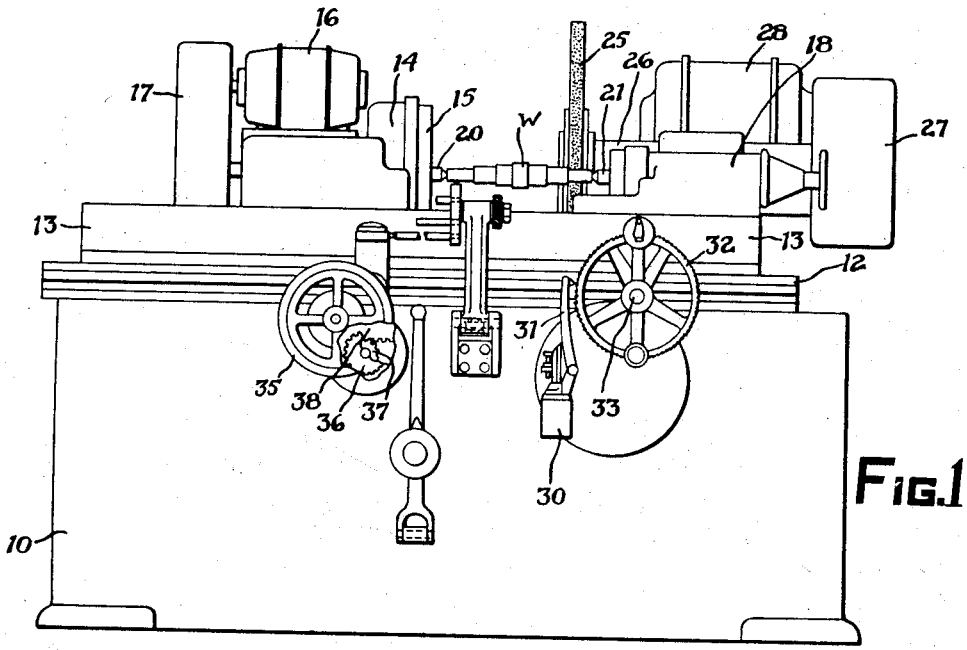
Figure 1 is a front elevation of a grinding machine having the attachment mounted thereon.
Figure 2:
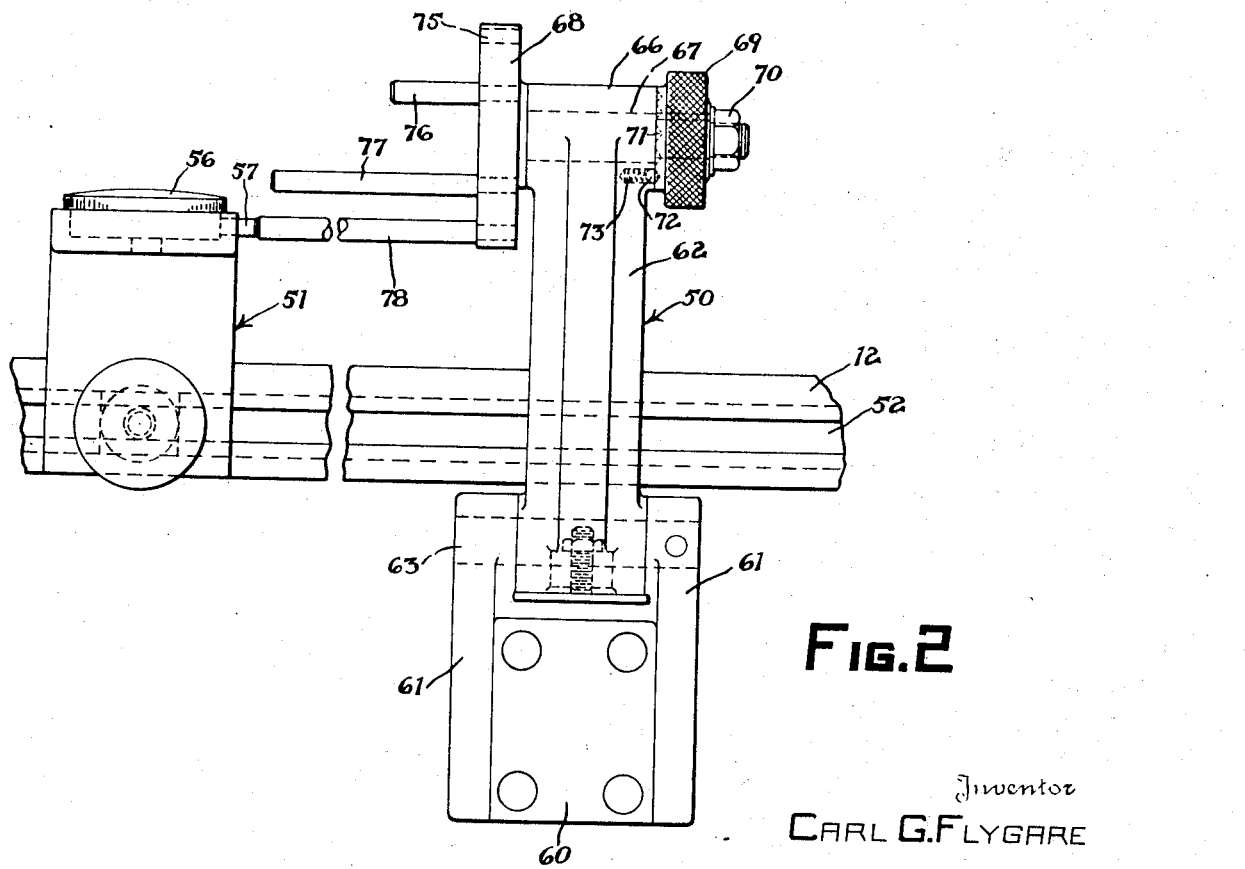
Figure 2 is an enlarged front elevation of the attachment and gauge with a fragment of the grinding carriage.
Figure 3:
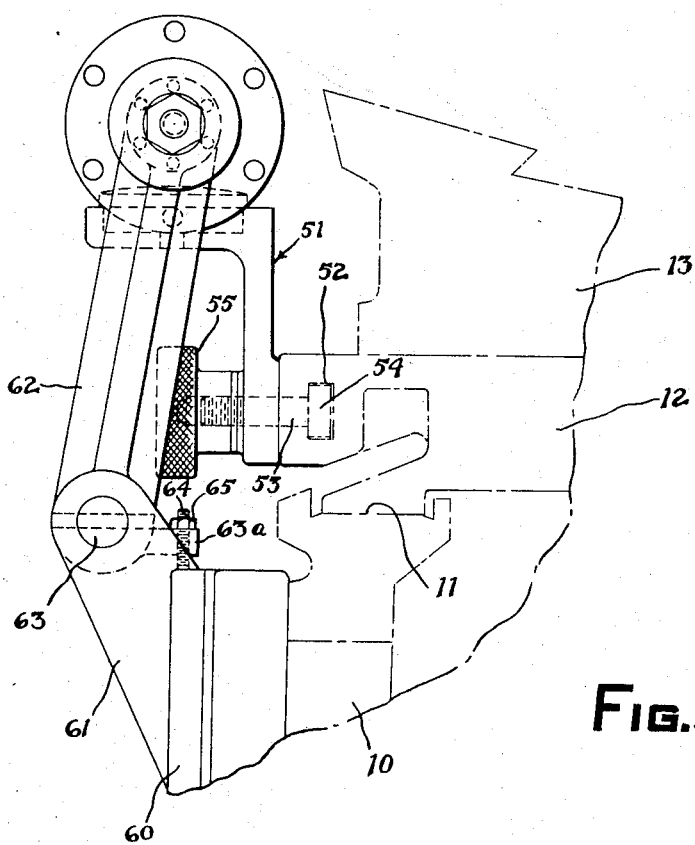
Figure 3 is an end view of the attachment and gauge.

Referring first to Figure 1, the invention may be incorporated in or applied to a cylindrical grinding machine of any desired type and so far as certain features of the invention are concerned it may be embodied in other types of grinding machines. As illustrative of the application of the invention I have shown in Figure 1 a grinding machine comprising a base 10, having, as shown in Figure 3, a flat way 11 which together with V-ways, not shown, supports a carriage 12 mounted for reciprocatory movement and indexing upon the base 10. The carriage 12 supports a work table 13 which may be secured to the carriage 12 in parallelism therewith or placed at an angle thereto by well known apparatus. Referring to Figure 1, upon the table 13 is mounted a headstock 14 which journals a spindle for a face plate 15, the spindle being driven by an electric motor 16 and belts contained in a casing 17. A tailstock 18 is also supported upon the table 13. The work piece W is supported between a head center 20 and a tail center 21 and rotated from the face plate 15 by any suitable driving dog, not shown. The grinding wheel 25 is mounted on a spindle journalled in a wheel head 26, the spindle being driven by belts in a casing 27 which are driven by a motor 28.

The wheel head 26 is mounted on or formed integral with a cross slide which can be moved toward and from the work piece W by cross feeding mechanism now well known in the art. Such may include a solenoid 30 actuating a pawl 31 which moves a ratchet wheel 32 mounted on a shaft 33, which shaft is connected by reduction gearing, not shown, to the cross feed screw shaft. Likewise well known mechanism may be provided for moving the carriage 12 and table 13; for example a hand wheel 35 has connected thereto a pinion gear, not shown, meshing with a spur gear 36 which is connected to a pinion gear 37 meshing with a rack 38 attached to the under side of the carriage 12.

The foregoing constitutes some of the elements of a plain cylindrical grinder which I shall not further describe herein.

I provide a variable stop device 50 and an adjustable stop device 51. One of these is attached to the base 10 and the other is attached to the carriage 12 or the table 13. In this illustrative embodiment of the invention the variable stop device 50 is attached to the base 10 while the adjustable stop device 51 is attached to the carriage 12. The table or carriage 12 includes a T-slot 52 such as is usually provided in grinding machines and the adjustable stop device 51 comprises an angle bracket having a bolt 53 with a head 54 in the T-slot which can be tightened by means of a knurled nut 55. The upper part of the angle bracket constituting the adjustable stop has a circular depression which holds a dial gauge 56 of any suitable or known type. This dial gauge 56 is operated by a movable plunger 57 which constitutes the contacting element of the stop.

The variable stop 50 comprises a pad 60 bolted to the base 10 having integral arms 61 between which is journalled an arm 62 on a pin 63. The arm 62 can be swung downwardly out of the way to put the variable stop 50 out of action altogether; at such times the arm 62 lies close to the base 10 in a vertical position extending downwardly from the arms 61. The arm 62 has an integral lug 63a through which extends a stop screw 64 having a nut 65. This stop screw 64 engages the top of the pad 60 for locating the arm 62 in its upper position.

Extending through a hub 66 formed on the upper part of the arm 62 is a shaft 67 integral with a disk 68. A knurled wheel 69 is keyed to the shaft 67 and held in place thereon by a nut 70. In the face of the knurled wheel 69 nearest the hub 66 are depressions 71 to receive a ball 72 pressed by a spring 73. This constitutes an indexing arrangement to position the disk 68 in various angular positions. The disk 68 has a number of holes 75 each one receiving a rod, for example the rods 76, 77 and 78. The rods 76, 77 and 78 are of varying lengths and any one of them may be brought in line with the plunger 57.

In one manner of operating the machine the operator first procures rods 76, 77 and 78 which differ in length by the distance to be established between various shoulders on the work piece W. He then inserts these rods in holes 75 in the disk 68. He then takes the first of a lot of work pieces W and grinds a given shoulder to a finished surface the exact required distance from the end of the shaft. In doing this the operator uses the hand wheel 35 and proceeds according to the old and known procedure using any suitable hand caliper or scale to measure the distance of the shoulder from the end of the shaft. At this time the adjustable stop 51 should be kept well out of the way.

The operator then brings the adjustable stop 51 into position against a particular rod which represents the shoulder ground. He does this just at the end of the grinding operation while the wheel 25 is still "sparking out" the ground surface on the work piece. The hand wheel 35 is not touched but the knurled nut 55 is loosened and the plunger 57 caused to contact with the rod selected. For example if the first shoulder being ground is the right hand shoulder, as shown in Figure 1, the long rod 78 will be selected for contact and the wheel 69 turned to bring it in line with the plunger 57, and then the adjustable stop 51 is moved to cause contact between the rod 78 and the plunger 57.

At this point an attempt is made to adjust the adjustable stop 51 to bring the needle on the dial gauge 56 to some even and convenient reading. For example the reading zero may be selected, or with some dial gauges a reading 5, 10, 20, etc., might be selected. It may be difficult to establish an exact even numbered reading on the dial gauge, in which event the operator merely remembers the particular reading as he clamps the adjustable stop 51 in position by means of the knurled nut 55.

The operator now turns the wheel 69 to bring the next longest rod 77 in line with the plunger 57. He then backs off the cross slide by rotating the wheel 32 by hand and then traverses the table (to the right in this illustrative embodiment) to bring the grinding wheel 25 into contact with the next shoulder. He then proceeds to grind using the hand wheel 35 to feed and using the wheel 32 to bring the periphery of the grinding wheel 25 as close to the cylindrical part of the work piece as desired. Also if desired the cylindrical surface of the work piece may be finished by the grinding wheel 25 before or after grinding a particular shoulder and without removing the work piece from the machine.

Having established contact between the side face of the wheel and the second shoulder to the required depth as determined by the cross feed of the machine, the operator proceeds to feed the wheel into the work piece by moving the carriage 12 by means of the hand wheel 35 until the needle in the dial gauge 56 registers the same as it registered during the setting of the adjustable stop 51 at the end of the grinding of the first shoulder. The second shoulder is now done and the third shoulder or any succeeding number may be ground in like manner.

Many variations in the use of the apparatus may be and undoubtedly will be employed. Also for certain purposes the adjustable stop 51 might have a contacting member which is integral therewith. However there is a certain advantage in using a dial gauge in so much as the grinding can be done by a feeding movement. In such grinding operations the traverse operating wheel 35 is used as a grinding feed wheel and the cross feed ratchet wheel 32 is used as a positioning wheel. Thus the function of the wheels 35 and 32 is reversed from the usual practice and the side face instead of the periphery of the wheel 25 does the grinding. Therefore the provision of a gauge 56 accurately to determine how much feed has been given by the traverse wheel 35 is a feature of considerable advantage and the ability to shift quickly from one shoulder to another merely by indexing the wheel 68 permits grinding to be done very rapidly. For example it is possible to do a little grinding on each of the shoulders to any given amount, then to finish them all off with the apparatus of this invention using the variable stop mechanism to shift from one shoulder to another knowing that whichever shoulder the operator is working upon, the amount ground off and to be ground off will always be measured by the dial gauge 56.

It will thus be seen that there has been provided by this invention a method and an apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a grinding machine, a base, a table or carriage mounted on said base, a variable stop mounted on one of said parts, an adjustable stop mounted on another of said parts, said variable stop comprising a mounting pad, an arm mounted in said pad for vertical swinging movement, a disk mounted on a horizontal axis in said arm, a plurality of rods of variable length extending horizontally from said disk, indexing means to turn the disk to various fixed angular positions, said adjustable stop including a clamping device and a locating stop member.

2. In apparatus as claimed in claim 1 the combination with the parts and features therein specified of a dial gauge operated from the stop member of the adjustable stop.

CARL G. FLYGARE.